United States Patent [19]
Sorstokke

[11] 3,897,523
[45] July 29, 1975

[54] CONTINUOUS PROCESS FOR PRODUCING DIALKYL PHOSPHOROCHLORIDOTHIONATES

[75] Inventor: Harold E. Sorstokke, New City, N.Y.

[73] Assignee: Stauffer Chemical Company, Westport, Conn.

[22] Filed: Sept. 18, 1973

[21] Appl. No.: 398,366

Related U.S. Application Data

[63] Continuation-in-part of Ser. No. 107,836, Jan. 19, 1971, abandoned, which is a continuation-in-part of Ser. No. 102,498, Dec. 29, 1970, abandoned, which is a continuation-in-part of Ser. No. 20,714, March 18, 1970, abandoned.

[52] U.S. Cl................................. 260/986; 260/960
[51] Int. Cl. ............................................. C07f 9/14
[58] Field of Search ................................... 260/986

[56] References Cited
UNITED STATES PATENTS
3,089,890  5/1963  Chupp et al. ................... 260/986 X
3,200,048  8/1965  Briggeman et al.............. 260/990 X

*Primary Examiner*—Anton H. Sutto

[57] ABSTRACT

This invention provides a continuous process for the production of dialkyl phosphorochloridothionates, which comprises chlorinating a dialkyl phosphorothioic acid in a two-stage chlorination zone to produce a reaction mixture containing a dialkyl phosphorochloridothionate, passing the reaction mixture into a film evaporation zone maintained under conditions including a temperature between about 90° and about 120°C. to separate a vaporous fraction comprising a dialkyl phosphorochloridothionate and a residue fraction, condensing the vaporous fraction and recovering a portion thereof as a product.

8 Claims, 1 Drawing Figure

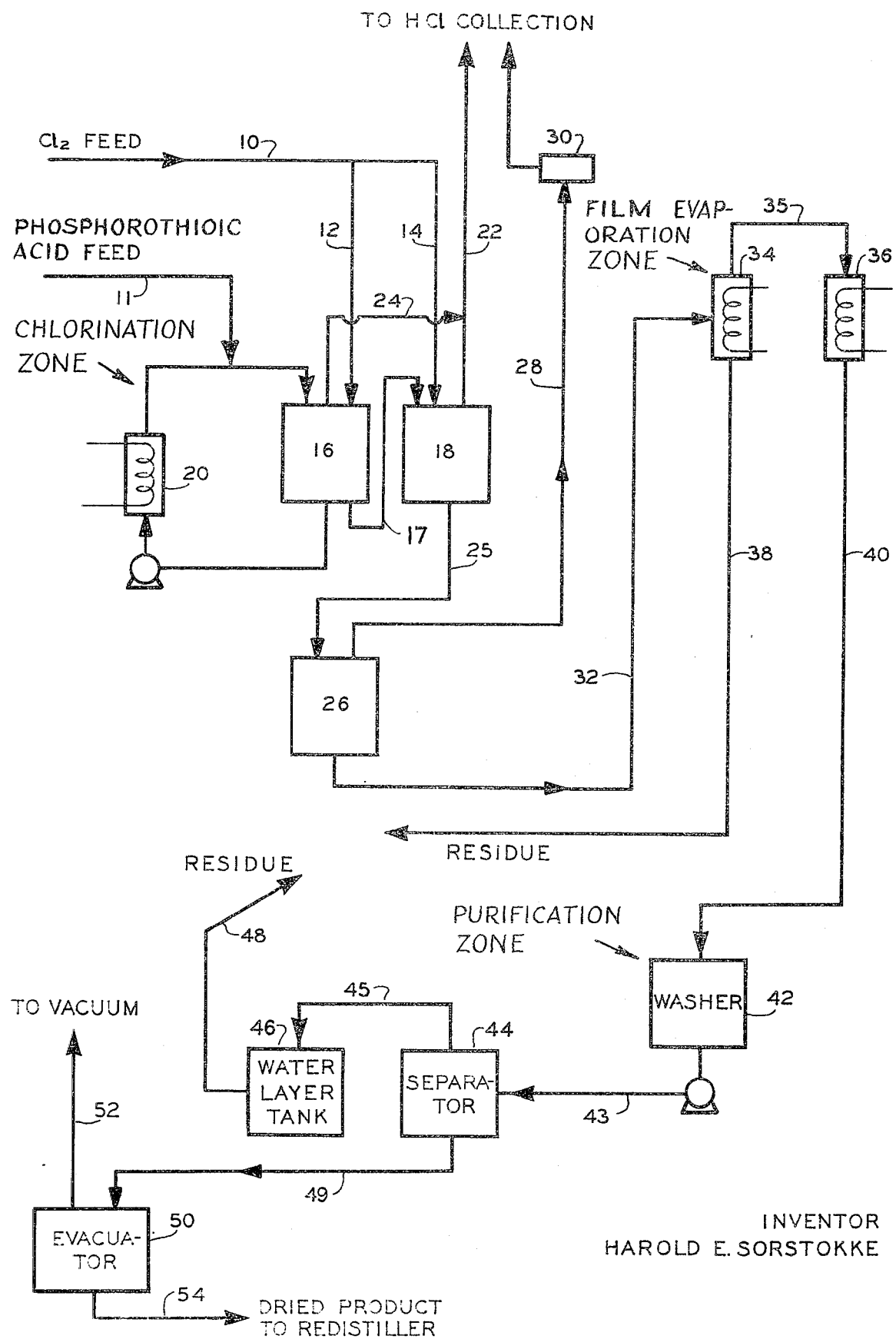

CONTINUOUS PROCESS FOR PRODUCING DIALKYL PHOSPHOROCHLORIDOTHIONATES

CROSS REFERENCE TO RELATED APPLICATION

This application is a continuation-in-part of U.S. application Ser. No. b 107,836 filed Jan. 19, 1971 now abandoned, which is a continuation-in-part of U.S. application Ser. No. 102,498 filed Dec. 29, 1970, now abandoned, which is a continuation-in-part of U.S. application Ser. No. 20,714 filed Mar. 18, 1970, now abandoned.

This invention relates to a process for the production of dialkyl phosphorochloridothionates. Dialkyl phosphorochloridothionates are well known materials and are disclosed in U.S. Pat. No. 3,089,890 and copending U.S. application Ser. No. 887,407 filed Dec. 22, 1969. More particularly, it relates to a continuous process for producing dialkyl phosphorochloridothionates which comprises chlorinating a dialkyl phosphorothioic acid in a suitable chlorination zone to produce a reaction mixture containing dialkyl phosphorochloridothionate passing the reaction mixture containing dialkyl phosphorochloridothionate into a continuous film evaporation zone to separate a vaporous fraction containing a phosphorochloridothionate, condensing the vaporous fraction and recovering a portion thereof as a product.

There are various processes known for producing the phosphorochloridothionates. However, all of these have been basically batch processes. In this basic type of batch process, there are the great disadvantages of higher operation and labor costs, and a lesser yield.

At the present time, there is a need for very large quantities of these phosphorochloridothionate intermediates. To do this by a conventional batch operation requires a multiplicity of batch vessels, whereas by the continuous method very large production rates can be achieved with a single process stream while having the very desirable result of keeping the inventory of a potentially hazardous process stream to a very low level.

Although the continuous method for producing the phosphorochloridothionate intermediates is advantageous over the batch process, there are certain problems and disadvantages that occur with a conventional continuous process. In a continuous process for chlorination of the dialkyl thioic acid, the chlorination takes place in a single stage operation. In a single stage operation of chlorination, it is necessary to use an excess of chlorine to obtain a reasonable and good yield of the dialkyl phosphorochloridothionate. This lessens the overall chlorine efficiency and promotes undesirable side reactions which reduce the product yield. It is also necessary in the one-stage chlorination operation that the single chlorine feed be metered with a high degree of accuracy to properly control the reaction and avoid the yield losses associated with under and over chlorination. To provide this accuracy, expensive metering equipment is required.

It is therefore the primary object of the present invention to provide a process which is both economical and capable of producing a large quantity of phosphorochloridothionates.

Another object of the present invention is to provide a process where the process streams are handled with a minimum residence time, whereas with a conventional batch operation the prolonged time cycles are detrimental to the ultimate yield.

An advantage of having a short residence time is to greatly reduce the inventory of a potentially hazardous material produced from the reaction such as the phosphorochloridothionates and residue which have produced violent explosions. This is of particular importance when using chlorine instead of more costly chlorinating agents such as the sulfur chlorides. Because of the greatly reduced inventory, it becomes feasible to use chlorine even though it results in a more thermally sensitive process stream.

Further objects and advantages inherent in the present invention will become apparent to those skilled in the art from the following description and disclosure.

The objects of the present invention are accomplished by passing a dialkyl phosphorothioic acid into and through a two-stage chlorination zone into which a chlorinating gas is added in succession to both stages under suitable conditions to produce a reaction mixture containing dialkyl phosphorochloridothionate. The reaction mixture containing the thionate with impurities is then passed to a continuous film evaporation zone where a vaporous fraction comprising the thionate is separated from the mixture and then passed to a condenser where the bulk portion of the vapor is condensed to a liquid containing the thionate and impurities. The crude or impure condensate is then passed to a purification zone to remove the impurities. The purified thionate in solution is then dried and the final product recovered, i.e., the dialkyl phosphorochloridothionate.

More specifically, the objects of the present invention are accomplished by chlorinating a phosphorothioic acid with chlorine in a chlorination zone to produce a reaction mixture containing a dialkyl phosphorochloridothionate. The reaction mixture is then passed to a film evaporation zone where a vaporous fraction containing the phosphorochloridothionate is separated. The vaporous fraction is then transferred to a condenser where the bulk of it is condensed to a liquid containing the thionate product and impurities. Then, the condensate is passed to a purification zone where the impurities are separated from the thionate product. The thionate is dried and the product recovered therefrom. This product as dried can be used at this point for conversion to various derivatives which may be used as insecticides or parathions. If a dialkyl phosphorochloridothionate of very high purity is desired, the dried product may be further purified by redistillation. The process stream containing concentrated impurities may readily be recycled to the film evaporation zone and then redistilled.

In the chlorination zone, it is preferred that the chlorinating agent be chlorine since it is the most economical and produces less undesirable by-product impurities than such chlorinating agents such as sulfur chloride.

The reaction mixture produced in the chlorination zone can be in the form of a solution or a slurry. Under optimum chlorination conditions the reaction mixture produced in the first chlorination zone is in the form of a solution and the reaction mixture produced in the second chlorination zone is in the form of a slurry.

Having described the process of the present invention briefly and in general terms, reference is now made to the drawing which illustrates diagrammatically in elevation one specific embodiment of the continuous process of the present invention. The drawing is described by reference to a numerical example which illustrates the flow of fluids and materials through one embodiment of this process, although it is to be understood that the invention is not limited unduly thereby.

Briefly described, the drawing illustrates an embodiment of the present invention of a continuous process for the production of dialkyl phosphorochloridothionates from a chlorine gas and thioic acid which react to form the thionate in a crude mixture. The product, together with volatile impurities, is separated in a vaporous fraction from a non-volatile residue, in a film evaporation zone, and then the gaseous fraction is condensed from which the product is recovered.

In this process, a chlorine gas and the thioic acid corresponding to the thionate to be produced are fed into a suitable chlorination zone, where a reaction mixture containing the thionate is produced. The reaction mixture is then introduced to a film evaporation zone which is a film evaporator 34 that may be any suitable film evaporator. Such an evaporator may be a jacketed unit or pipe having a bladed agitator extending vertically through its center. In this operation, as a liquid is fed into the top of the unit, the bladed agitator distributes the liquid in a uniform film on the inner walls of the unit and as a sufficient amount of heat is applied to the unit, a vaporous fraction containing the thionate is formed. In the evaporator, the vaporous fraction is separated from a liquid residue fraction and then passed to a condenser 36, where the bulk of it is liquefied. The thionate in the distillate may be recovered as it is since it has a sufficiently high purity ranging from about 85 to about 95%. If a higher purity is desired, then the distillate containing the thionate and impurities may be transferred to a purification zone where the impurities are separated from the thionate solution. The thionate in solution may be purified by any suitable means such as being washed with water in a washer 42, as shown in the drawing, and described in the specific example hereinbelow.

The thionate in solution may also be purified according to the process described in application Ser. No. 887,407, filed Dec. 22, 1969. In that process, a corresponding dialkyl phosphorothioic acid is added to a thionate solution containing impurities in a sufficient amount to react with at least one of the impurities to form the thionate. The thionate is then separated by conventional means in a substantially pure state from the remaining impurities.

For purposes of a numerical example, a chlorinating agent such as chlorine is fed through a main line 10 and auxiliary lines 12 and 14, to a two-stage chlorinating zone which includes two mixing tanks 16 and 18 that represent the respective stages, and a heat exchanger 20. At the same time, a phosphorothioic acid is fed into the chlorination zone into the first mixer 16 or first chlorination stage, via line 11 wherein the major portion of the chlorine utilized to chlorinate the phosphorothioic acid is admitted. It is preferred to introduce from about 60 to about 93% and most preferably from about 70 to about 88% of the chlorine feed to the process into the first chlorination zone. Approximately 80% of the chlorine fed into the system is fed into the first mixer 16. Chlorine is added to the thioic acid in a molar ratio between about 0.95:1.0 and about 1.5:1.0. For optimum yields, a small excess of chlorine is generally reacted with the thioic acid at a temperature ranging from about 40° to about 80°C. and preferably from about 50° to 75°C. The reaction temperature is usually controlled by cooling means. In the Figure the reaction mixture is circulated from the first mixer 16 through the heat exchanger 20 where the excess heat of the reaction is removed. The reaction mixture is then passed to the second mixing tank 18 via line 17 together with the additional chlorine being fed via line 14 which extends from the main chlorine line 10.

The second mixer 18 may have a second heat exchanger (not shown) arranged in conjunction with it, or the mixer 18 may be jacketed in order to remove or limit the excess heat from the reaction within the mixer 18.

The HCl produced in mixers 16 and 18, is conducted respectively, through lines 24 and 22, to a HCl collection area and the thionate solution is passed from mixer 18 into an evacuator 26 via line 25. In the evacuator, a portion of the HCl which has been dissolved into the product solution or other low boiling point impurities contained therein, are drawn off by a vacuum 30 via line 28 and sent to the HCl collection area. The thionate solution stripped of the dissolved HCl is then passed through line 32 to the film evaporator 34, where a vaporous fraction containing the thionate is formed and separated from a residue fraction containing non-volatile material. The vaporous fraction is emitted from the film evaporator via line 35 to the condenser 36. The non-volatile residue material is discharged from the evaporator 34 at temperatures ranging from about 90° to 120°C. via line 38 and may be transferred to a by-product recovery system where the residue material may be converted to useful products such as phosphoric acid and sulfur.

The vaporous fraction containing the thionate is liquefied in the condenser 36. The thionate makes up about 85 to about 95% of the liquid condensate which is dropped or drawn off the bottom of the condenser 36 via line 40 to a purification zne. In the purification zone, or washing tank 42, water is added in a weight ratio of about one part to every two parts of the liquid condensate. The water is maintained at a temperature between about 10° and 60°C. The water in which the impurities are soluble forms an aqueous phase and the other portion of the liquid condensate containing the thionate forms an organic phase. The two phases, i.e, the organic and aqueous, are transferred from tank 42 to a separator 44 via line 43. In the separator 44, the water or aqueous layer is drawn off via line 45 to a water layer tank 46 where the water containing impurities is drawn off and transferred to the by-product recovery system as the residue is from the film evaporator 34.

As the aqueous layer is being drawn off, the organic layer containing the purified product, i.e., the thionate, is transferred via line 49 to an evacuator 50 where the dissolved or entrained water is removed by a vacuum through line 52. The dried product is removed through line 54. The thionate product may be used in the form in which it is extracted, or it may be redistilled to a more pure product.

In the chlorination zone, the temperature is maintained between about 50° and 75°C. and the chlorine is added in a molar ratio to the thioic acid of about 1:1, with an excess of approximately 5 to 10% to complete the chlorination of the thioic acid. In the film evaporation zone, it is necessary to have a temperature at a higher degree, i.e., from about 90° to about 120°C. to separate the vaporous fraction containing the thionate product in a short period of time, i.e. less than about a minute. The temperature of the condenser 36, in order to liquefy the gaseous fraction is maintained at a temperature of approximately 50° to 80°C.

In the washing tank 42, the water is added at a temperature less than 75°C., and preferably between 10° and 40°C., and in a weight ratio of one part for every two parts of liquid condensate fed thereto.

It is noted that the two-stage chlorination of the present invention, provides a high yield of the phosphorochloridothionate, i.e., higher than that provided by a one-stage chlorination. Accordingly, by the present operation there is less chlorine required to chlorinate the phosphorochloridothionate.

Also, in the two-stage chlorination process provided by the present invention, the feeding of the clorine into the system is not critical as to the first stage for variations in the smaller range into the second stage may occur without any serious yield losses. For example, a 5% variation in the flow to the second stage is equivalent to only about 1% or less of a loss. Accordingly a more flexible and effective control of the mixers and reactors stoichiometry is the end result.

In the present process, by having a shorter contact time in the second stage, the overall process is more effective in that the chlorination of the dialkyl phosphorochloridothionate products is limited since more than half of the product is not formed until the second stage. That is, the concentration of the dialkylphosphorochloridothionate in the first stage is 50% less than that in the second stage.

It is also noted that in the washing and purification process, that the impurities can be removed more easily by using warm water rather than cool water.

The percentage of yield by the present process can be in excess of 85% and is generally between 70 and 85%.

The following examples serve to further illustrate specific embodiments of the continuous process of the present invention.

EXAMPLE 1

One-Stage Chlorination of Dimethylphosphorothioic Acid 0.238 moles of crude dimethylphosphorothioic acid and about 0.247 moles of a gaseous chlorine (4% excess) were simultaneously fed to a single stage of a continuous reaction system containing a slurry of chlorinated dithioic acid. The reaction temperature was maintained at 55°C. by external water cooling. Hydrogen chloride from a degassing chamber was routed to a water scrubber.

A sample of the reaction slurry was distilled in a suitable apparatus. Approximately 60% of the sample was recovered as an 87% pure dimethylphosphorochloridothionate distillate. After the batch-washing and drying, 86% of the distillate was recovered as a product layer with a purity greater than 99%. The overall yield based on the dithioic acid was about 61%.

EXAMPLE 2

Two-Stage Chlorination of Dimethylphosphorothioic Acid 0.203 moles of crude dimethylphosphorothioic acid and 0.177 moles of gaseous chlorine per hour were simultaneously fed into the first stage of a continuous reaction system containing a partially chlorinated dithioic acid. The reaction temperature was maintained at 57°F. by external water cooling. Hydrogen chloride from a degassing chamber was routed to a water scrubber.

The clear reaction mixture overflowed to a second reaction zone containing a slurry which is fed with 0.035 moles of gaseous chlorine (4% excess) to complete the reaction. The temperature in the second reactor was maintained at 76°C. by water cooling. The slurry was sampled and vacuum distilled in suitable apparatus. Approximately, 69% of the samples recovered as a 91% pure dimethylphosphorochloridothionate distillate. After batch washing and drying, a 90% of the distillate was separated as a product layer with a purity higher than 99%. The overall yield based on the dithioic acid was 75%.

EXAMPLE 3

0.18 moles of a crude diethyl phosphorodithioic acid and 0.15 moles of gaseous chlorine were simultaneously fed per hour to a continuous reaction system containing a partially chlorinated dithioic acid. The system consisted of a gas sparger, a mixing chamber with a high speed agitator, an agitated disengaging section, a recycle pump and double pipe heat exchangers. The temperature in the reaction zone was maintained at 50°C. by removing the heat of reaction in a heat exchanger with cooling water. The effluent hydrogen chloride gas from the disengaging section was absorbed in a co-current water scrubber. The liquid overlow from this first stage was further contacted with chlorine in a jacketed vessel with a high speed agitator. A gaseous chlorine flow of 0.032 moles per hour was continuously fed into this second reactor, which was maintained at 70°C. by circulating water through the reactor jacket. The resultant slurry was continuously discharged to a surge chamber from which it was drawn into a film evaporator heated to 104°C. and maintained at 5mm Hg absolute pressure by a three stage steam ejector. The material vaporized was condensed in an auxilliary water cooled condenser. Approximately 0.135 moles per hour of diethyl phosphorochloridothionate was recovered as a 93% pure distillate. The crude distillate was subsequently batch-washed with water using a 2/1 ratio of crude to water. The washing temperature was between 36° and 39°C. 94% of the original crude was separated as a product layer, which after drying with an appropriate drying agent yielded a diethyl phosphorochloridothionate with a purity greater than 98% by gas chromatographic measurements. The overall yield based on dithioic acid was 75%.

EXAMPLE 4

0.235 moles of crude dimethyl phosphorodithioic acid and 0.204 moles of gaseous chlorine were simultaneously fed per hour to a continuous reaction system (as in Example 1) containing a partially chlorinated dithioic acid. Cooling water maintained the reaction temperature at 48°C. Hydrogen chloride gas from the degassing chamber was routed to a water scrubber. The second stage was continuously fed with 0.05 moles of chlorine to complete the reaction.

The temperature in the second reaction zone was maintained at 64°C. The slurry was discharged to a surge vessel and fed to a flim evaporator maintained at 92°C. and 7 mm Hg absolute pressure. Approximately 0.169 moles per hour of dimethyl phosphorochloridothionate was recovered as an 88% pure distillate.

The crude distillate was subsequently batch-washed with water using a 2/1 ratio at a temperature between 44° and 59°C. 86% of the original crude was separated as a product layer, which after drying chemically yielded a dimethylphosphorochloridothionate with a purity of 97%. The overall yield based on dithioic acid was 72%.

EXAMPLE 5

Two-Stage Chlorination of Dimethylphosphorothioic Acid

Crude dimethyl phosphorodithioic acid in the amount of 13.7 moles and 10.3 moles of gaseous chlorine per hour were simultaneously fed into the first chlorination zone of a continuous reaction system containing a partially chlorinated dithioic acid. The reaction temperature was maintained at 66°C. by external water cooling. Hydrogen chloride evolving from the reaction mixture was routed to a water scrubber.

The clear reaction mixture continuously passed to a second reaction zone containing a slurry and contacted with 4.27 moles per hour of chlorine. The slurry in the second reaction zone was maintained at 63°c.

The slurry was sampled and vacuum distilled at 90°C. and 3 mm Hg absolute pressure. Dimethylphosphorochloridothionate was recovered as an 88% pure distillate. The crude distillate was batch washed using a 2:1 weight ratio of water and dried. An amount equal to 89% of the original was recovered as dimethylphosphorochloridothionate with a purity above 98%. The overall yield based on dithioic acid was 73%.

EXAMPLE 6

Two-Stage Chlorination of Dimethylphosphorothioic Acid

Crude dimethylphosphorodithioic acid in the amount of 19.4 moles and 12.6 moles of gaseous chlorine per hour were simultaneously fed into the first chlorination zone of a continuous reaction system containing a partially chlorinated dithioic acid. The reaction temperature was maintained at 80°C. by external water cooling. Hydrogen chloride evolving from the reaction mixture was routed to a water scrubber.

The clear reaction mixture continuously passed to a second reaction zone containing a slurry and contacted with 9.13 moles per hour of chlorine. The slurry in the second reaction zone was maintained at 70°C.

The slurry was sampled and vacuum distilled at 90°C. 3 mm Hg absolute pressure. Dimethylphosphorochloridothionate was recovered as an 85% pure distillate. The crude distillate was batch washed using a 2:1 weight ratio of water and dried. An amount equal to 85% of the original crude was recovered as dimethylphosphorochloridothionate with a purity above 98%. The overall yield based on dithioic acid was 71%.

The present invention, although preferably carried out as described herein, is not limited to temperatures employed in carrying out the chlorination reaction, the evaporation operation, and the condensation or purification process, as indicated above, and any suitable temperatures can be employed therein.

Having thus described the present invention with reference to a specific example illustrated in the drawing, it is to be understood that many modifications and alterations will become apparent to those skilled in the art without departing from the scope of the present invention and that the present invention is limited only to the claims.

What is claimed is:

1. A continuous process for producing dialkyl phosphorochloridothionate which comprises:
   a. continuously introducing a dialkyl phosphorothioic acid and chlorine into a first reaction mixture containing a dialkyl phosphorochloridothionate maintained at a temperature from about 40°C. to about 80°C. in a first chlorination zone wherein dialkyl phosphorothioic acid and chlorine are reacted, the amount of chlorine introduced into said first chlorination zone is between about 60 and about 93 percent of the chlorine feed to the process,
   b. continuously transferring a portion of the first reaction mixture to a second chlorination zone wherein said first reaction mixture is continuously reacted with chlorine in a second reaction mixture maintained at a temperature of from about 40°C to about 80°C. the amount of chlorine introduced into said second chlorination zone is sufficient to bring the total amount of chlorine introduced into said first and second chlorination zones to between about 0.95 and about 1.5 moles of chlorine per mole of dialkyl phosphorothioic acid; and
   c. recovering dialkyl phosphorochloridothionate.

2. A continuous process according to claim 1 wherein between about 70 and about 90 percent of the chlorine introduced into the process is introduced into the first chlorination zone.

3. The process of claim 2 wherein the first reaction mixture is a solution and the second reaction mixture is a slurry.

4. A continuous process according to claim 1 wherein about 80 percent of the chlorine introduced into the process is introduced into the first chlorination zone.

5. The process of claim 2 wherein the amount of chlorine admitted to the process is in excess of approximately 5 to 10% to complete the chlorination.

6. The process of claim 1 in which the dialkyl phosphorochloridothionate is recovered by passing a mixture containing dialkyl phosphorochloridothionate into a film evaporation zone maintained under conditions including a temperature between about 90°C. and about 120°C. to separate a vaporous fraction comprising a dialkyl phosphorochloridothionate and a residue fraction and condensing said vaporous fraction and recovering a portion thereof as product.

7. The process of claim 1 wherein the second reaction mixture is passed to a vacuum zone wherein HCl is stripped from the reaction mixture under reduced pressure and then passed to a film evaporation zone maintained under conditions including a temperature between about 90°C. and about 120°C. to separate a vaporous fraction comprising a dialkyl phosphorochloridothionate and a residue fraction and condensing said vaporous fraction and recovering a portion thereof as product.

8. The process of claim 1 wherein the temperature of the first reaction mixture in the first chlorination zone is maintained between about 40°C. and about 80°C. by circulating the reaction mixture through a heat exchange zone to remove heat therefrom.

* * * * *

UNITED STATES PATENT AND TRADEMARK OFFICE
CERTIFICATE OF CORRECTION

PATENT NO. : 3,897,523
DATED : July 29, 1975
INVENTOR(S) : Harold E. Sorstokke

It is certified that error appears in the above-identified patent and that said Letters Patent are hereby corrected as shown below:

Column 1, line 6 delete "b";

Column 4, line 38 change "ZNE." to -- ZONE. --;

Column 6, line 31 change "overlow" to -- overflow --.

Signed and Sealed this second Day of March 1976

[SEAL]

Attest:

RUTH C. MASON
Attesting Officer

C. MARSHALL DANN
Commissioner of Patents and Trademarks